(12) United States Patent
Darnell

(10) Patent No.: US 9,415,711 B2
(45) Date of Patent: Aug. 16, 2016

(54) ADJUSTABLE HEAD AND NECK SUPPORT DEVICE

(75) Inventor: Thomas A. Darnell, Wellsville, KS (US)

(73) Assignee: SIMPSON PERFORMANCE PRODUCTS, INC., New Braunfels, TX (US)

( * ) Notice: Subject to any disclaimer, the term of this patent is extended or adjusted under 35 U.S.C. 154(b) by 666 days.

(21) Appl. No.: 13/282,548

(22) Filed: Oct. 27, 2011

(65) Prior Publication Data

US 2013/0104295 A1 May 2, 2013

(51) Int. Cl.
*B60N 2/48* (2006.01)
*A41D 13/05* (2006.01)

(52) U.S. Cl.
CPC .......... *B60N 2/4805* (2013.01); *A41D 13/0512* (2013.01)

(58) Field of Classification Search
CPC .......................... A41D 13/0512; B60N 2/4805
USPC ............. 2/410, 411, 421, 422, 425, 455, 459, 2/460, 461, 468; 602/18
See application file for complete search history.

(56) References Cited

U.S. PATENT DOCUMENTS

| | | | |
|---|---|---|---|
| 4,638,510 A | 1/1987 | Hubbard | |
| 5,930,843 A * | 8/1999 | Kelly | ................................ 2/468 |
| 6,009,566 A | 1/2000 | Hubbard | |
| 7,371,222 B2 | 5/2008 | Heinz et al. | |
| 2010/0121238 A1* | 5/2010 | Mazzarolo | ...................... 602/18 |
| 2010/0229290 A1* | 9/2010 | Nelson | ............................... 2/425 |
| 2011/0004980 A1 | 1/2011 | Leatt et al. | |
| 2011/0225713 A1* | 9/2011 | Lopez Vicente et al. | ......... 2/468 |

FOREIGN PATENT DOCUMENTS

| | | |
|---|---|---|
| WO | 2008114215 A1 | 9/2008 |
| WO | 2009/133524 | 11/2009 |
| WO | 2009133524 A1 | 11/2009 |

* cited by examiner

*Primary Examiner* — Katherine Moran
(74) *Attorney, Agent, or Firm* — Everman Law Firm, PA; Gregory R. Everman

(57) ABSTRACT

A head and neck support (HANS) device comprises a collar, a left leg unit, a right leg unit, and a leg unit rotation control assembly. The collar may be positioned behind a wearer's neck. The left leg unit may be coupled to a left side of the collar to engage the wearer's left shoulder and chest area. The right leg unit may be coupled to a right side of the collar to engage the wearer's right shoulder and chest area. The leg unit rotation control assembly may include male splines and female splines to allow the leg units to rotate with respect to the collar when the female splines are separated from the male splines and to rigidly fix the position of the leg units with respect to the collar when the female splines are interlocked with the male splines.

15 Claims, 16 Drawing Sheets

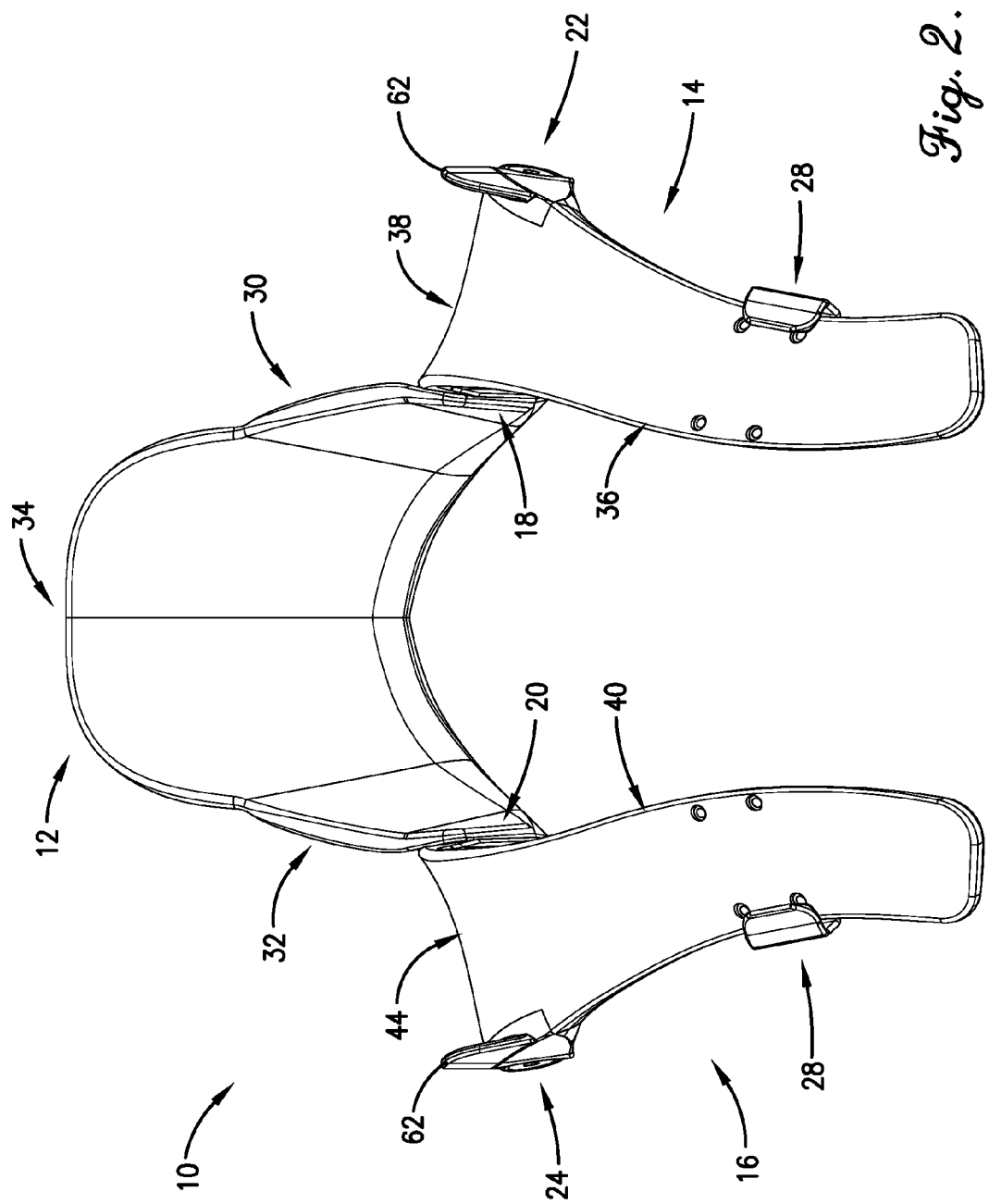

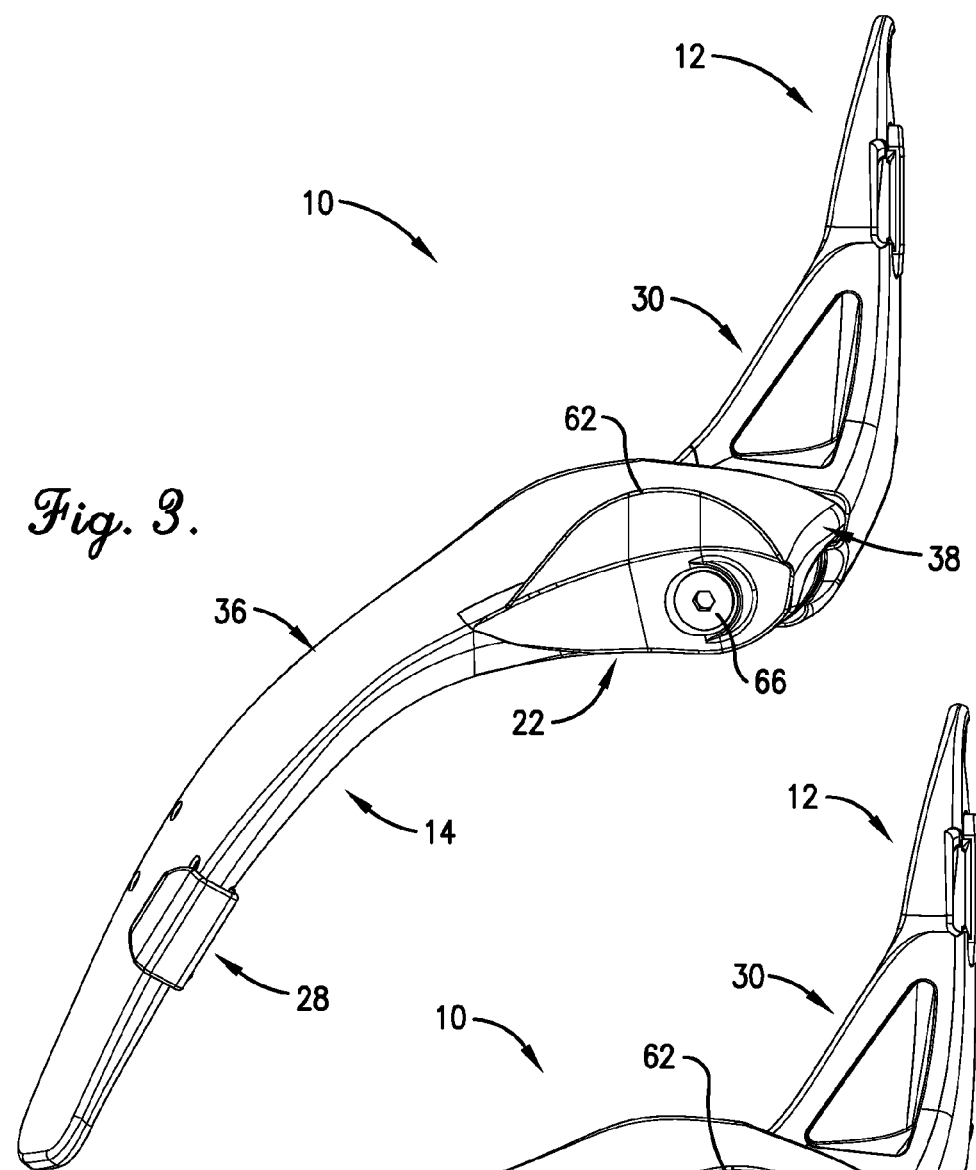
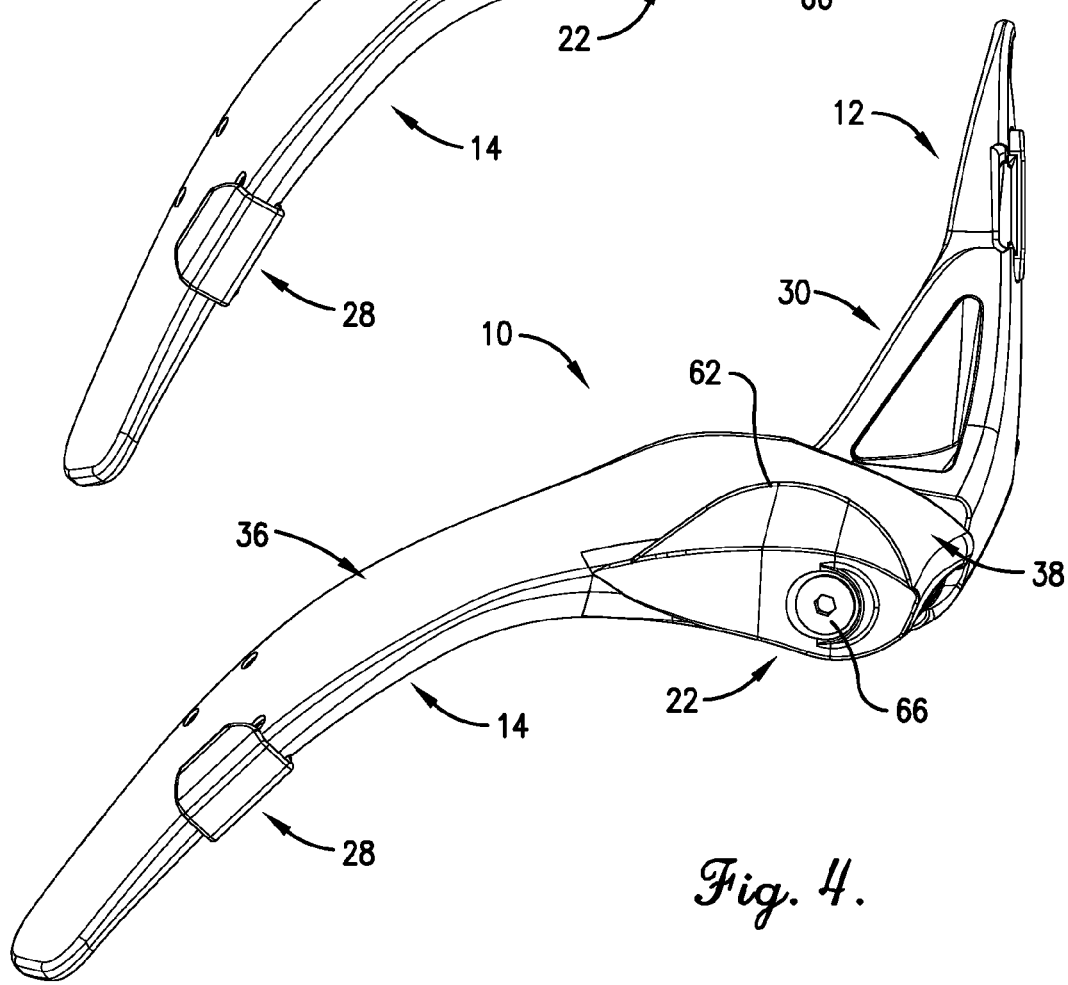

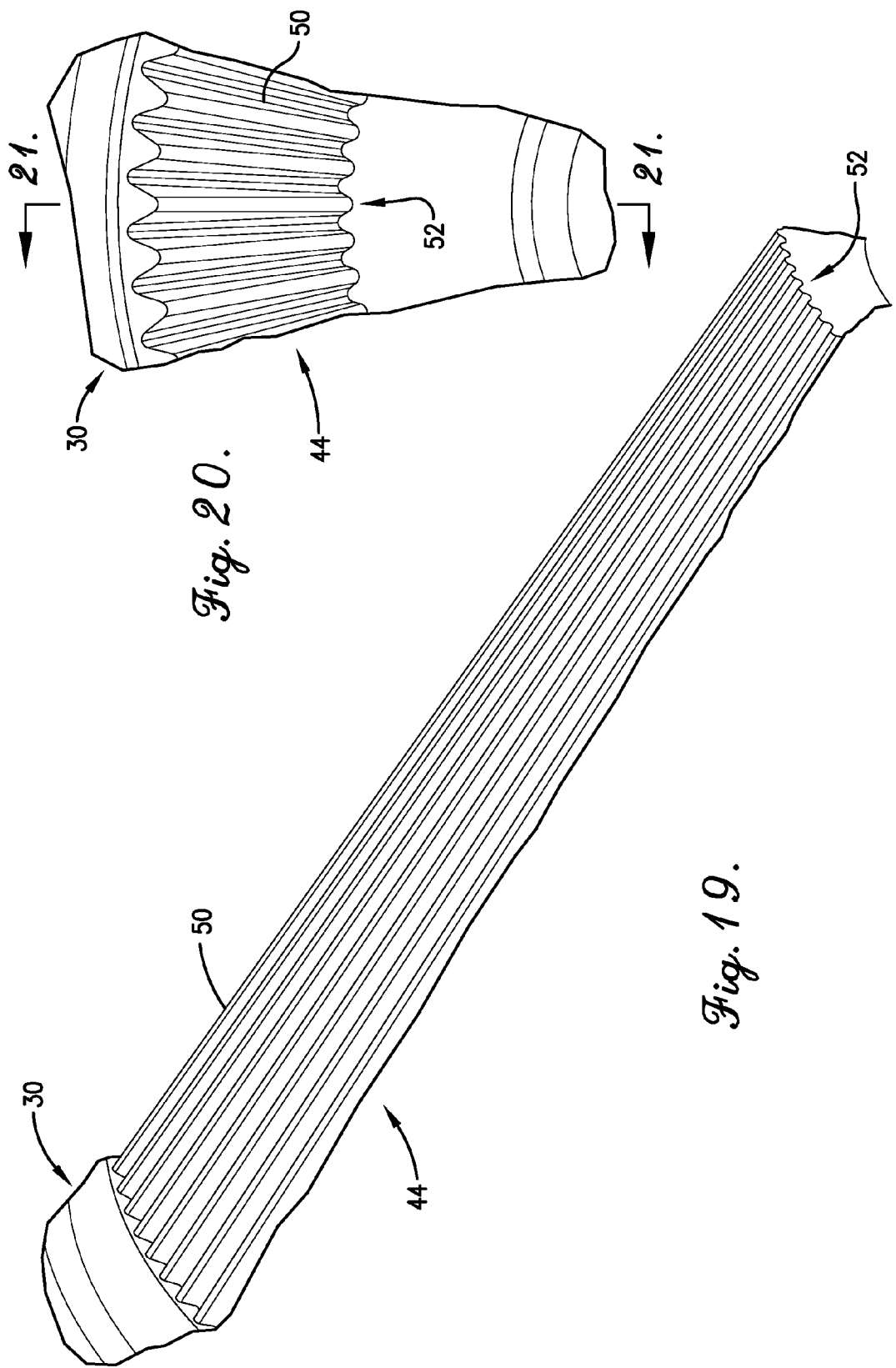

ADJUSTABLE HEAD AND NECK SUPPORT DEVICE

FIELD OF THE INVENTION

Embodiments of the present invention relate to head and neck support devices.

BACKGROUND OF THE INVENTION

A head and neck support (HANS) device is a structure that is worn around the neck and over the shoulders of a race car driver while racing. The HANS device is intended to reduce the likelihood or severity of head and/or neck injuries in the event of a crash or collision. A typical HANS device includes a collar, a left leg unit, and a right leg unit. The collar is an upright member in the center of the HANS device that is positioned behind the wearer's neck and the head when the device is worn. The left and right leg units are connected to the left and right sides of the collar and are generally elongated and curved outward away from the collar. The left and right leg units may be positioned at an angle with respect to the collar. The left and right leg units engage the wearer's shoulders and the upper part of the chest. The driver's helmet is tethered to the back of the collar to prevent the driver's head from being jerked forward in the event of a head-on or front end collision.

Typically, the HANS device is a unitary or monolithic structure that is not adjustable. In order to accommodate different sized drivers and different driving or racing situations, the HANS device is manufactured in a variety of shapes, sizes, and configurations. This requires race teams to purchase multiple different HANS devices and often leads to confusion for the driver who must figure out which HANS device he needs for proper safety and comfort.

Therefore, a heretofore unaddressed need exists in the art to address the aforementioned deficiencies and inadequacies.

SUMMARY OF THE INVENTION

Embodiments of the present invention solve the above-mentioned problems and provide a distinct advance in the art of head and neck support (HANS) devices. More particularly, embodiments of the invention provide HANS devices that allow quick and easy rotation of a left leg unit and a right leg unit with respect to a collar in order to accommodate different sized drivers or different racing requirements. In addition, various embodiments of the HANS device provide spacers positioned between the left leg unit and the collar and the right leg unit and the collar that provide greater separation between the left leg unit and the right leg unit.

A HANS device constructed in accordance with various embodiments of the present invention may broadly comprise a collar, a left leg unit, a right leg unit, a left epaulet, a right epaulet, a leg unit rotation control assembly, and a spacer. The collar may be positioned behind the wearer's neck. The left leg unit may be coupled to a left side of the collar to engage the wearer's left shoulder and chest area. The right leg unit may be coupled to a right side of the collar to engage the wearer's right shoulder and chest area. The left epaulet may be removably coupled to the left leg unit, and the right epaulet may be removably coupled to the right leg unit. Each epaulet may be operable to prevent a shoulder strap from a safety harness from sliding off of a shoulder portion of the HANS device.

The leg unit rotation control assembly may include a first male spline, a second male spline, a first female spline, a second female spline, a first threaded fastener, and a second threaded fastener. The first male spline may be coupled to or integrally formed with the left side of the collar. The second male spline may be coupled to or integrally formed with the right side of the collar. The first female spline may be coupled to or integrally formed with the left leg unit. The second female spline may be coupled to or integrally formed with the right leg unit. The assembly may allow the left leg unit and the right leg unit to rotate with respect to the collar when the female splines are separated from the male splines and to rigidly fix the position of the left leg unit and the right leg unit with respect to the collar when the female splines are interlocked with the male splines. The first threaded fastener may couple with an axial opening in the first male spline, and the second threaded fastener to couple with an axial opening in the second male spline. Each threaded fastener may hold one female spline in contact with one male spline.

This summary is provided to introduce a selection of concepts in a simplified form that are further described below in the detailed description. This summary is not intended to identify key features or essential features of the claimed subject matter, nor is it intended to be used to limit the scope of the claimed subject matter. These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWING FIGURES

The accompanying drawings illustrate one or more embodiments of the invention and, together with the written description, serve to explain the principles of the invention. Wherever possible, the same reference numbers are used throughout the drawings to refer to the same or like elements of an embodiment. The drawings do not limit the present invention to the specific embodiments disclosed and described herein. The drawings are not necessarily to scale, emphasis instead being placed upon clearly illustrating the principles of the invention.

FIG. 2 is a front view of the HANS device.

FIG. 3 is a left side view of the HANS device with a left leg unit and a right leg unit positioned at an approximate 30-degree angle with respect to a collar.

FIG. 4 is a left side view of the HANS device with the left leg unit and the right leg unit positioned at an approximate 45-degree angle with respect to the collar.

FIG. 19 is a fragmentary perspective view of a male spline with a plurality of outer teeth from the left leg rotation control assembly in isolation.

FIG. 20 is a fragmentary front view of the male spline from FIG. 19.

DETAILED DESCRIPTION OF THE EMBODIMENTS

Figure 1:
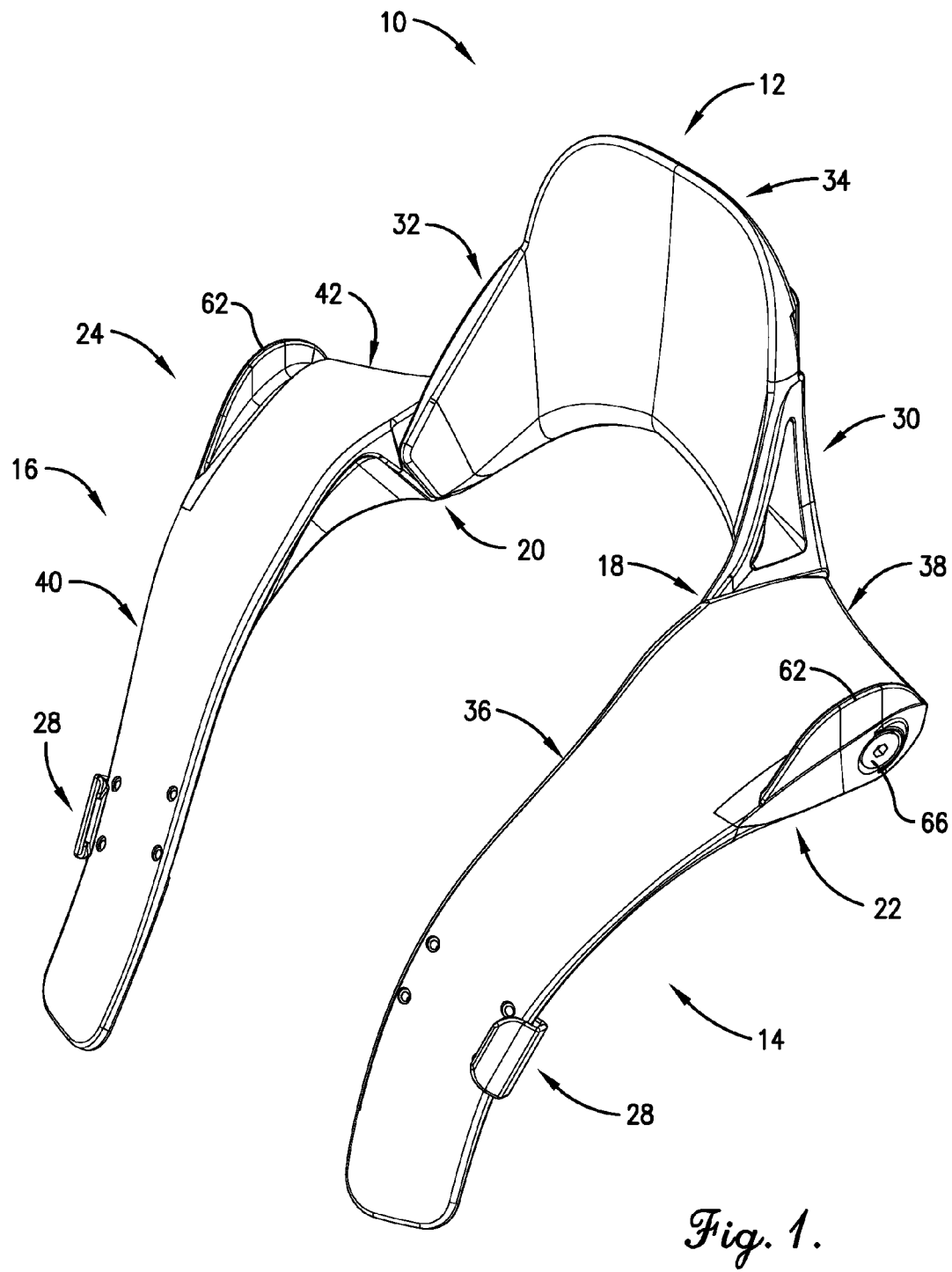
FIG. 1 is a perspective view of a HANS device constructed in accordance with various embodiments of the present invention.
Figure 5:
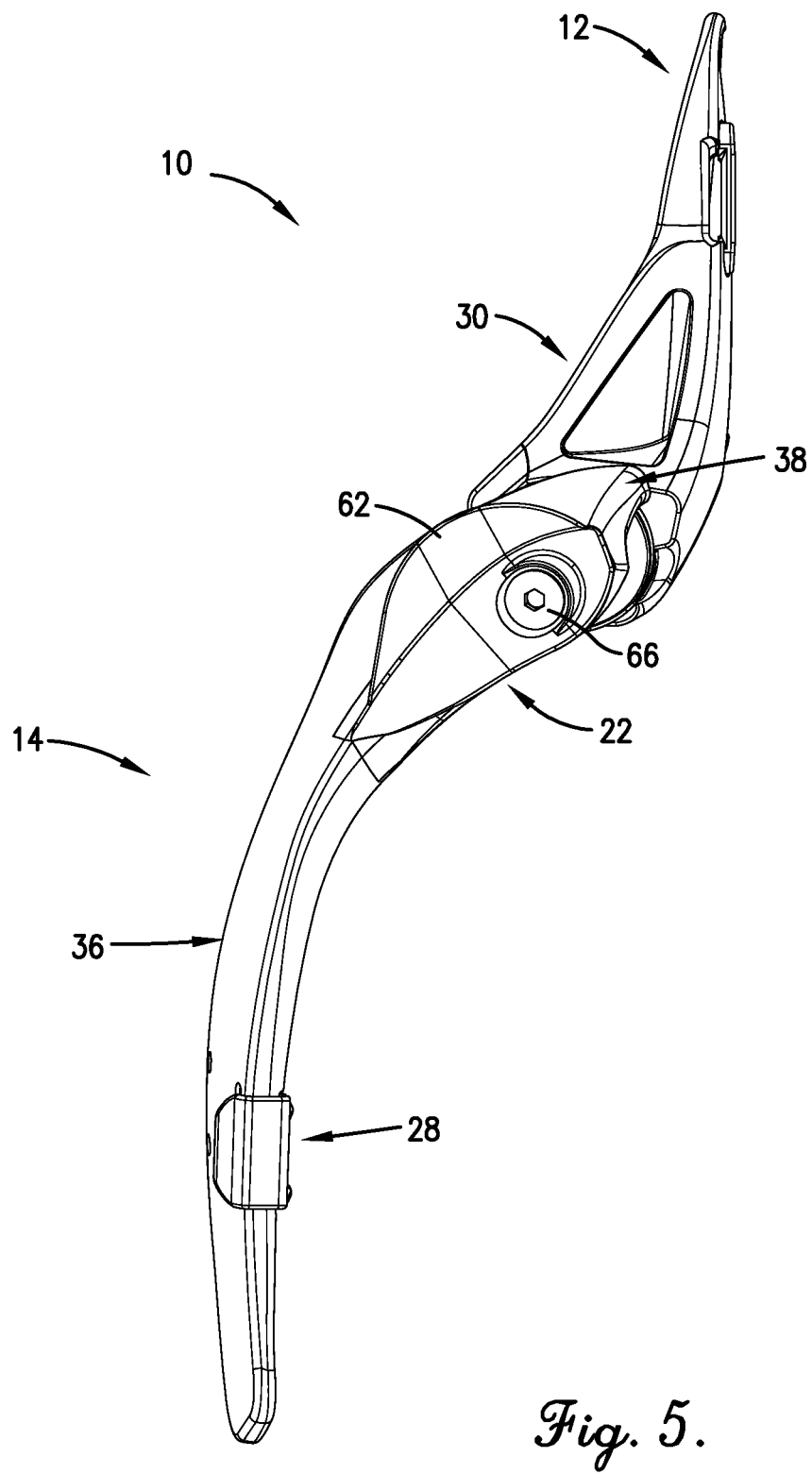
FIG. 5 is a left side view of the HANS device with the left leg unit and the right leg unit positioned at an approximate 10-degree angle with respect to the collar.
Figure 6:
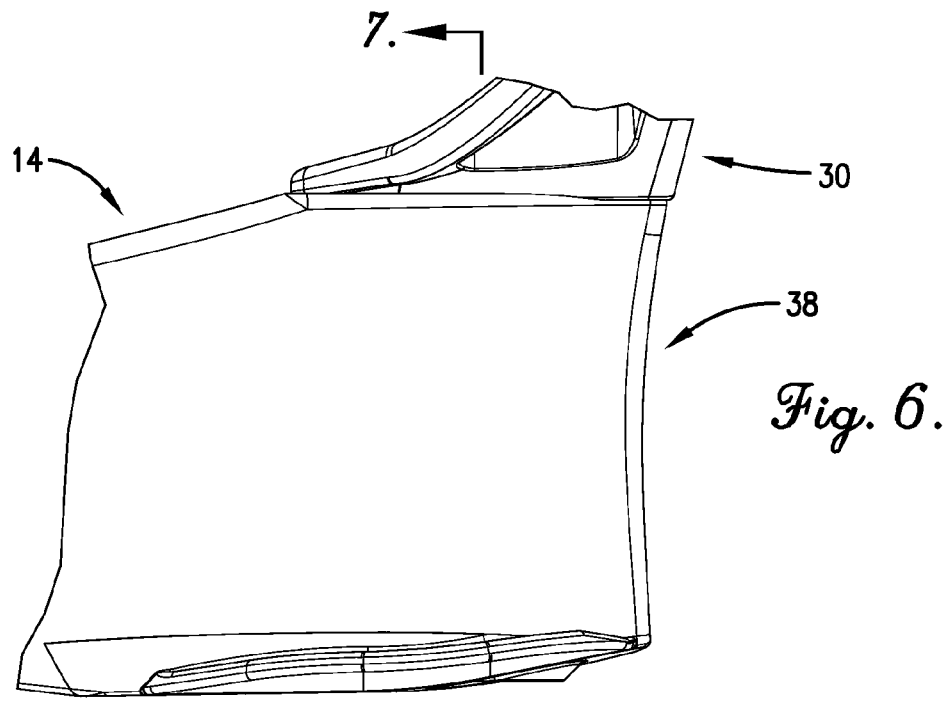
FIG. 6 is a fragmentary top view of a shoulder portion of the left leg unit and a left portion of the collar.
Figure 7:
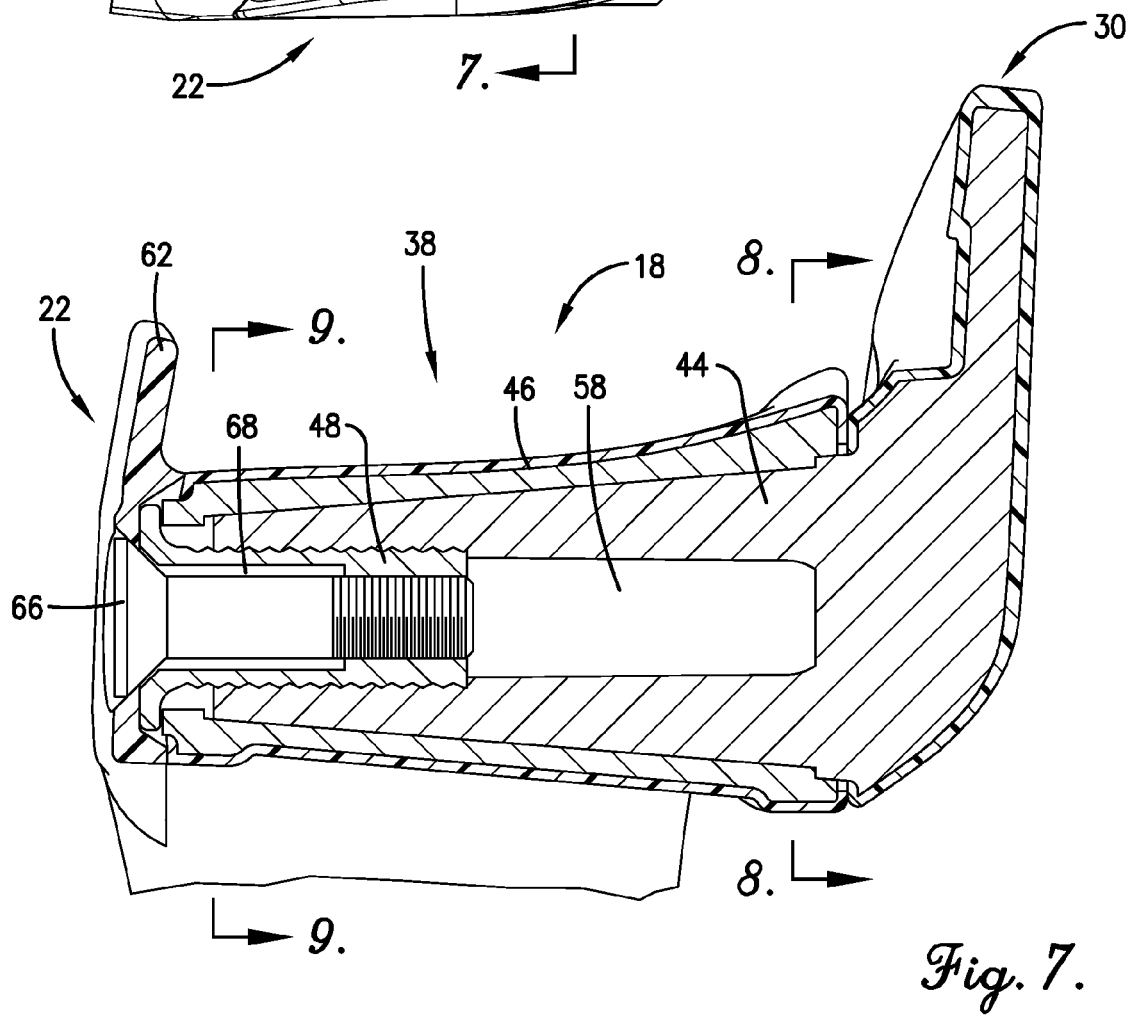
FIG. 7 is a fragmentary sectional view of the left leg unit and the collar taken along line 7-7 of FIG. 6 depicting a left leg rotation control assembly.
Figure 8:
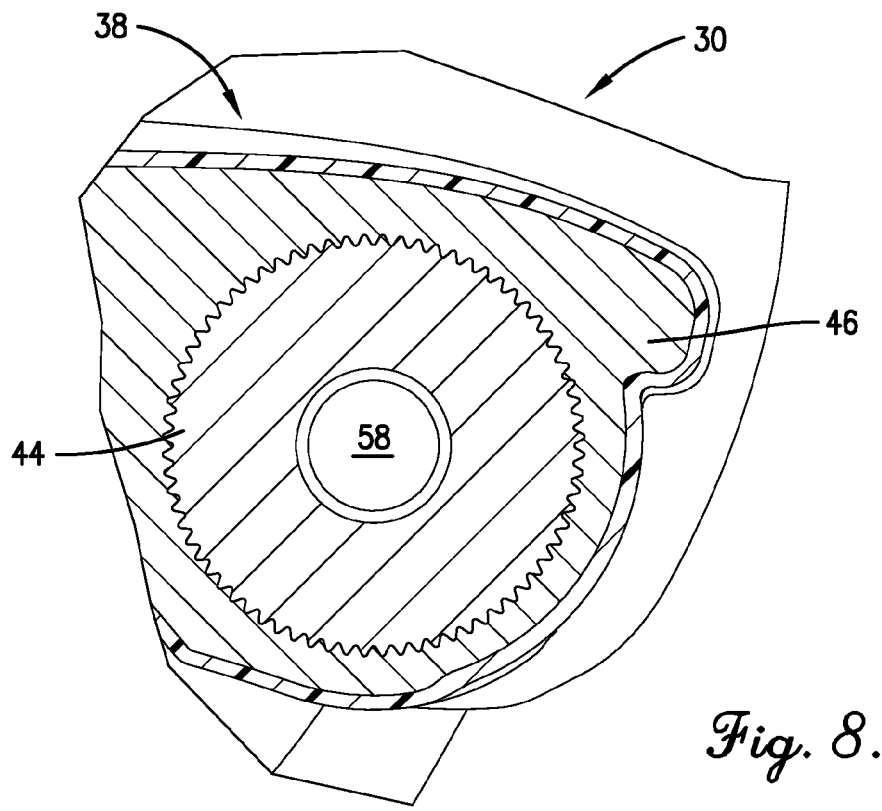
FIG. 8 is a fragmentary sectional view of the left leg unit and the left leg rotation control assembly taken along line 8-8 of FIG. 7.
Figure 9:
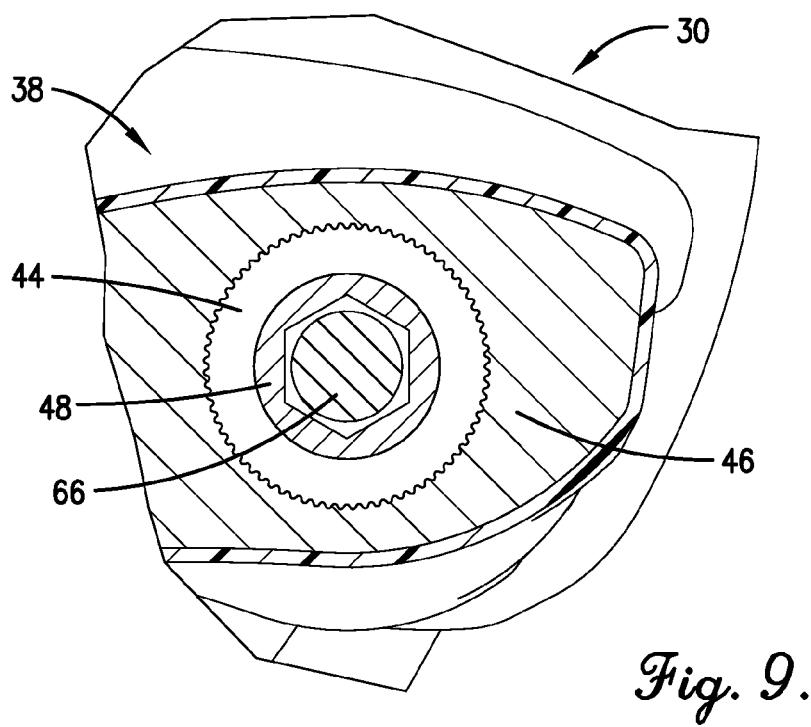
FIG. 9 is a fragmentary sectional view of the left leg unit and the left leg rotation control assembly taken along line 9-9 of FIG. 7.
Figure 10:
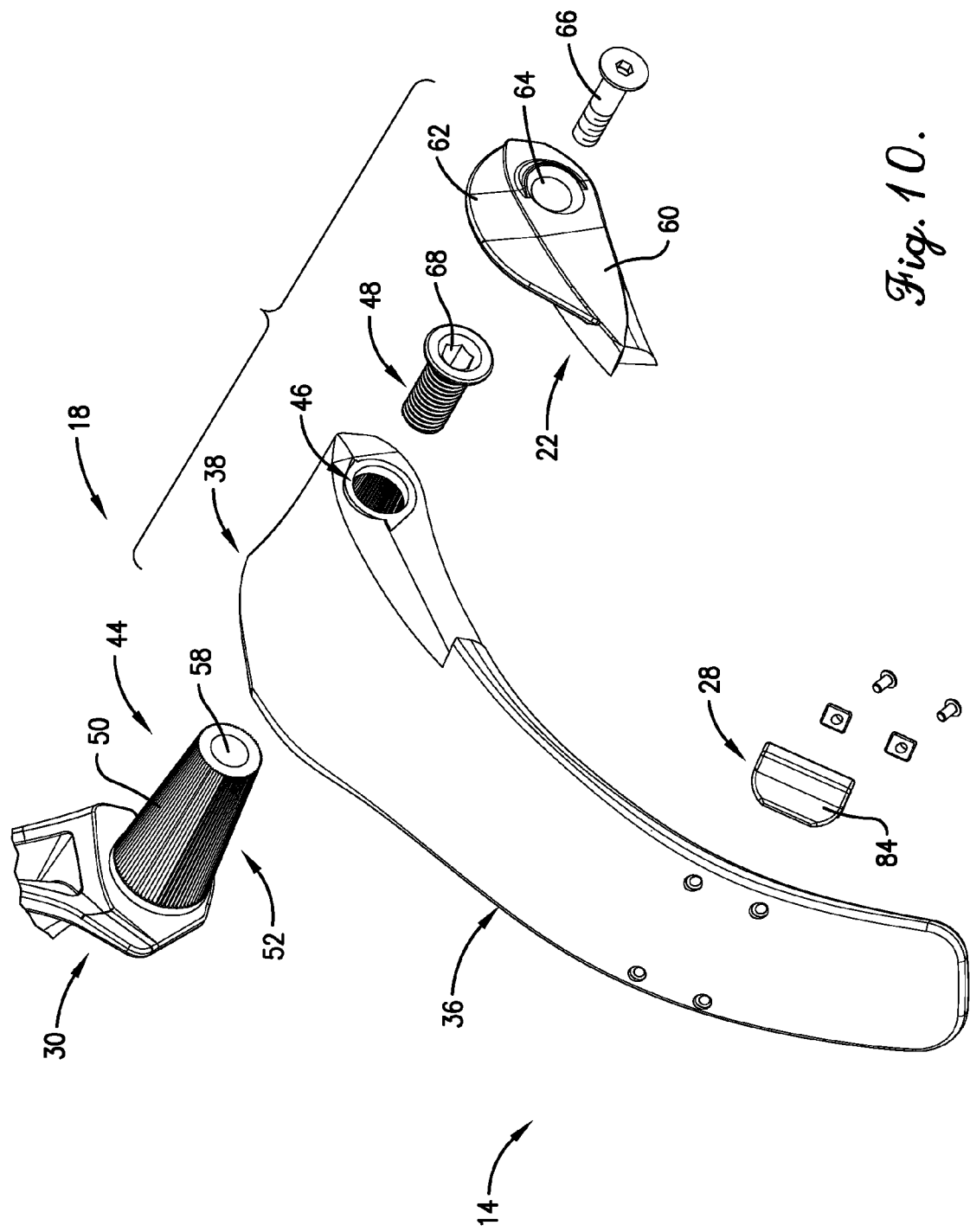
FIG. 10 is a forward perspective exploded view of the left leg unit and the left leg rotation control assembly in isolation.
Figure 11:
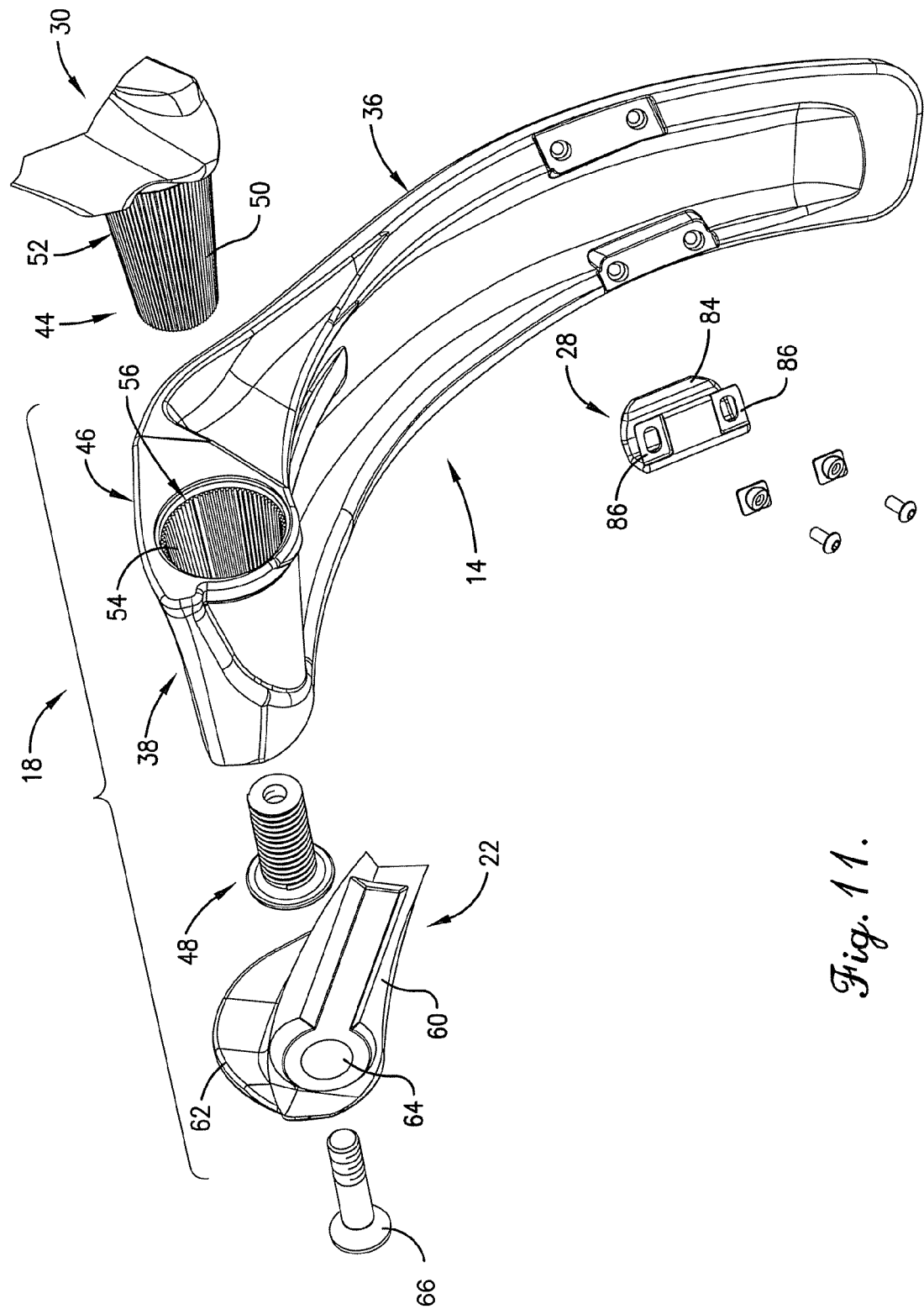
FIG. 11 is a rear perspective exploded view of the left leg unit in isolation.
Figure 12:
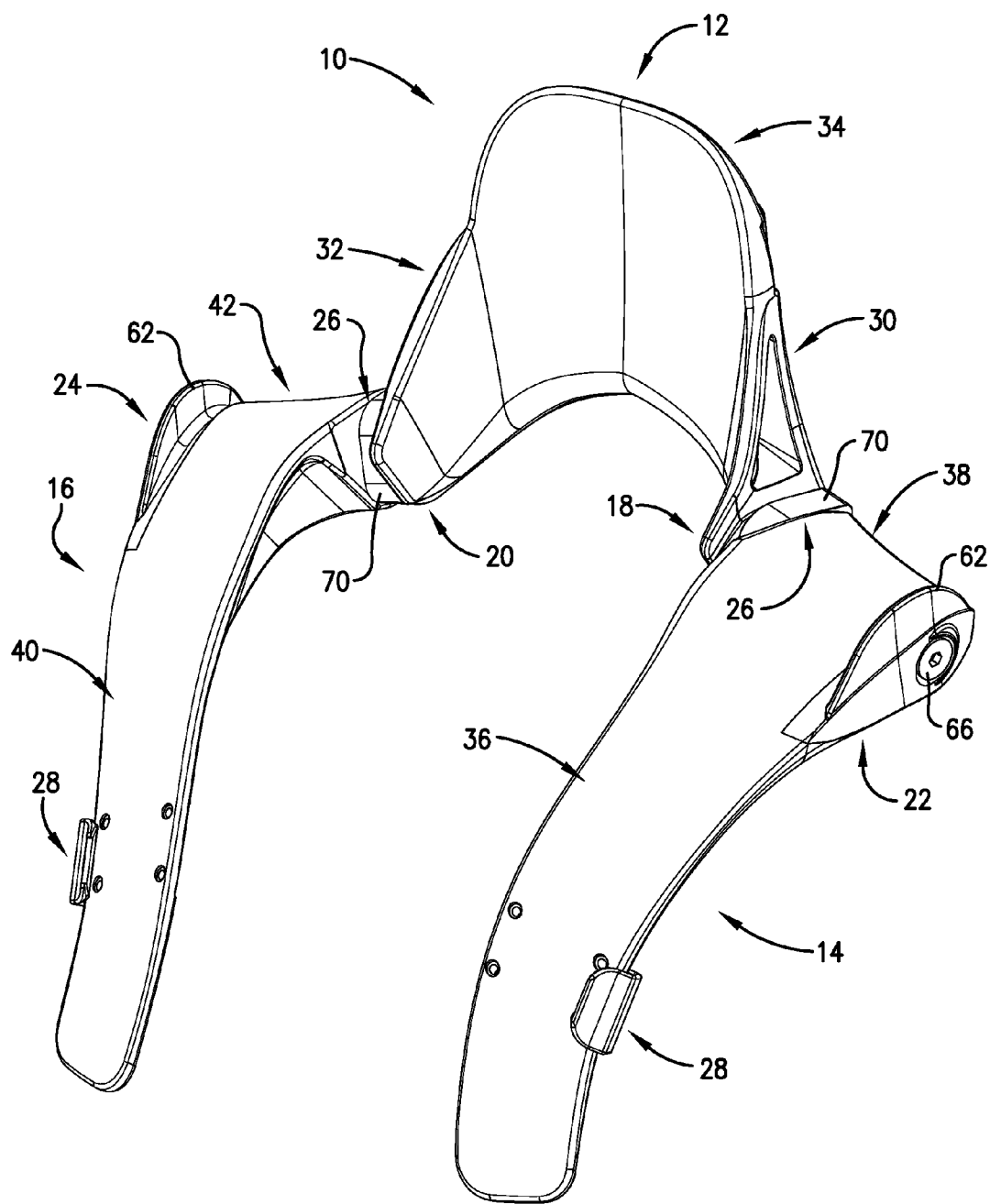
FIG. 12 is a perspective view of the HANS device including a spacer positioned between the left leg unit and the collar, and a spacer positioned between the right leg unit and the collar.
Figure 13:
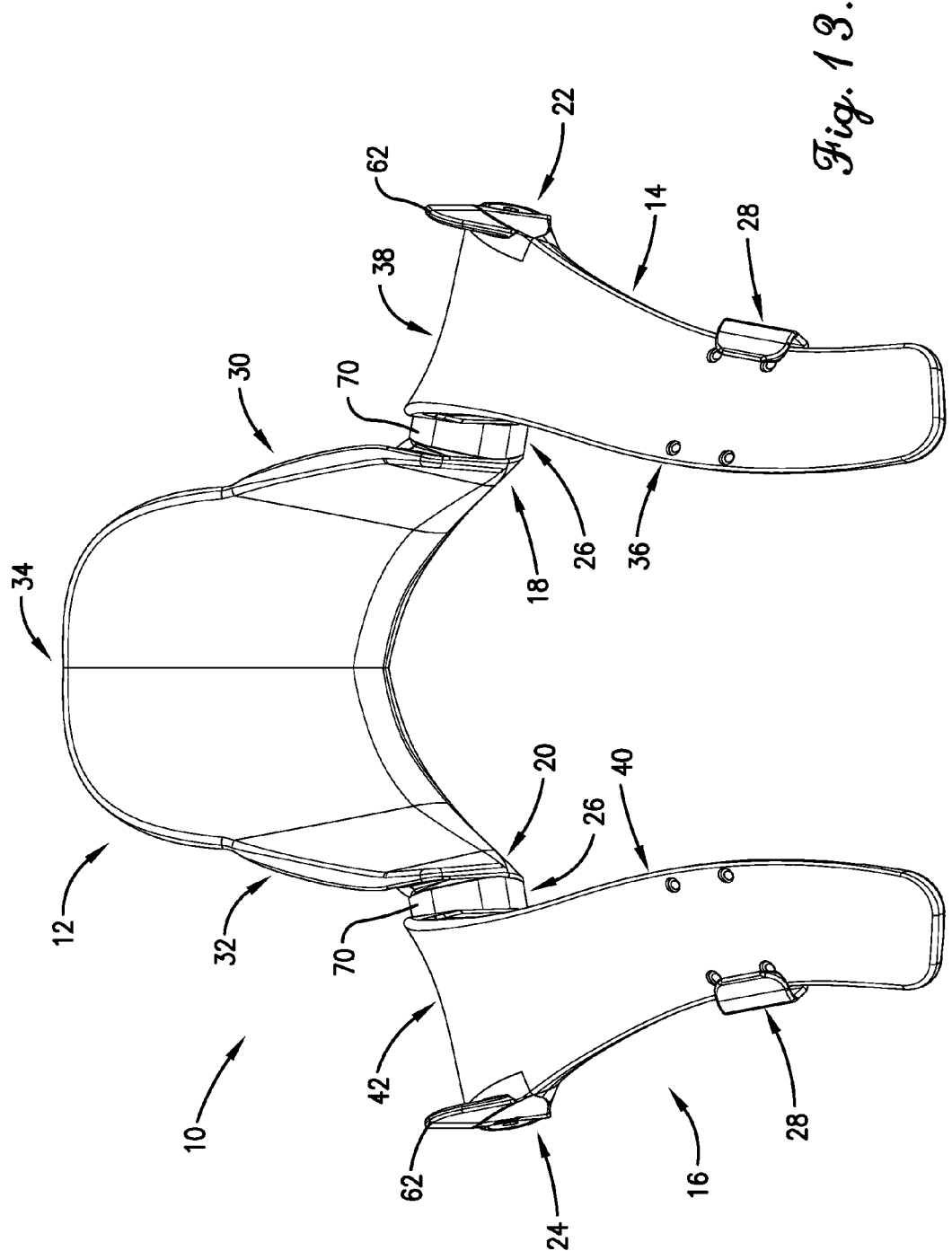
FIG. 13 is a front view of the HANS device with the spacers.
Figures 14, 15:
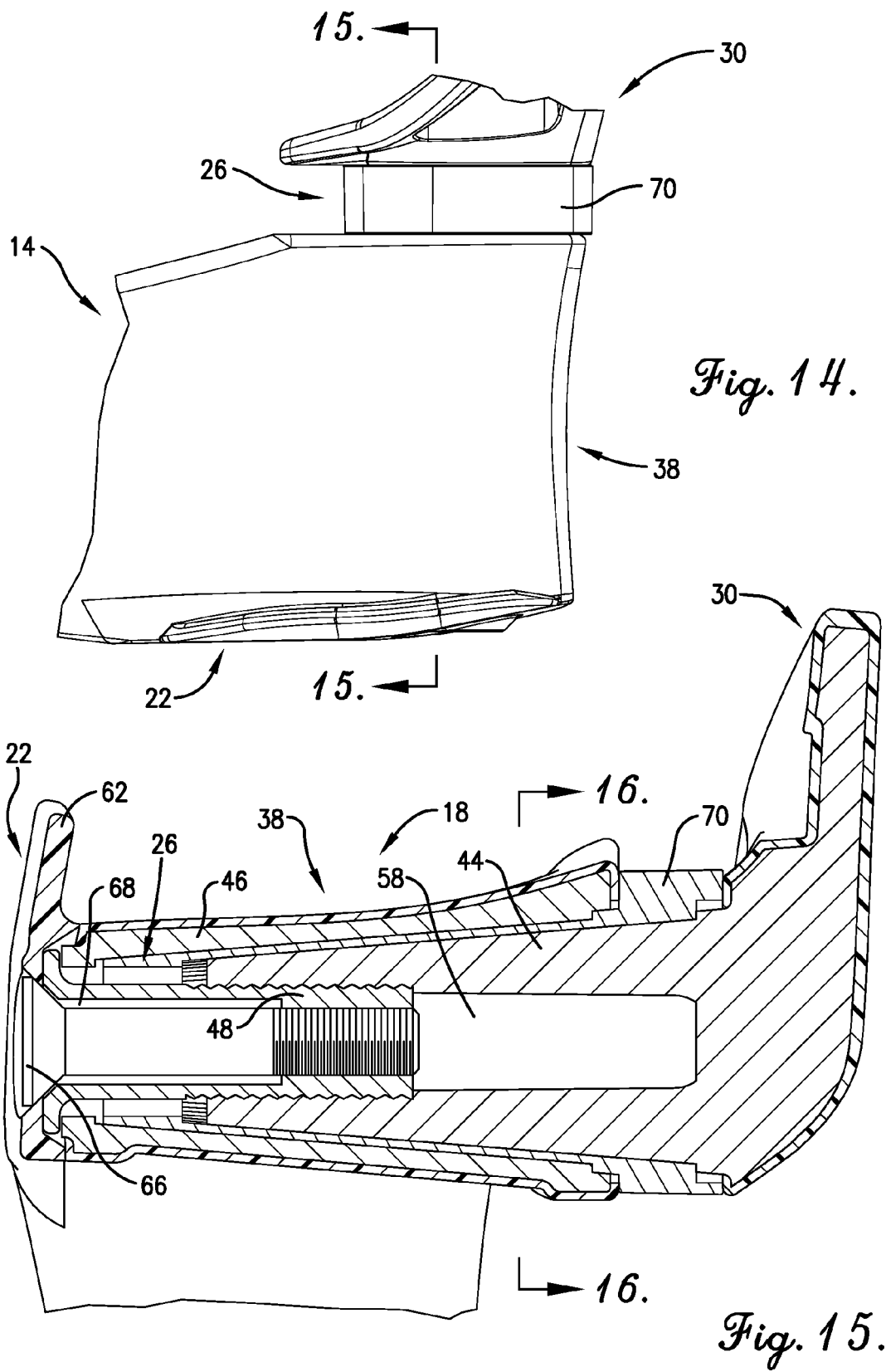
FIG. 14 is a fragmentary top view of the shoulder portion of the left leg unit, the spacer, and the left portion of the collar.
FIG. 15 is a fragmentary sectional view of the left leg unit, the left leg rotation control assembly, the spacer, and the collar taken along line 15-15 of FIG. 14.
Figure 16:
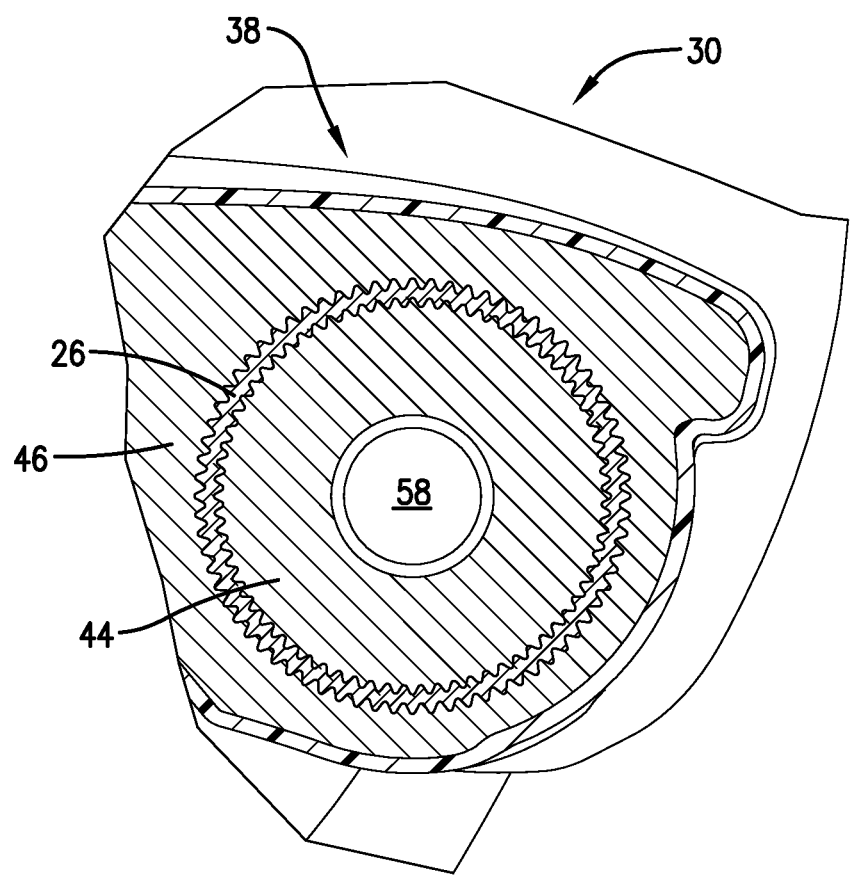
FIG. 16 is a fragmentary sectional view of the left leg unit, the left leg rotation control assembly, and the spacer taken along line 16-16 of FIG. 15.
Figure 17:
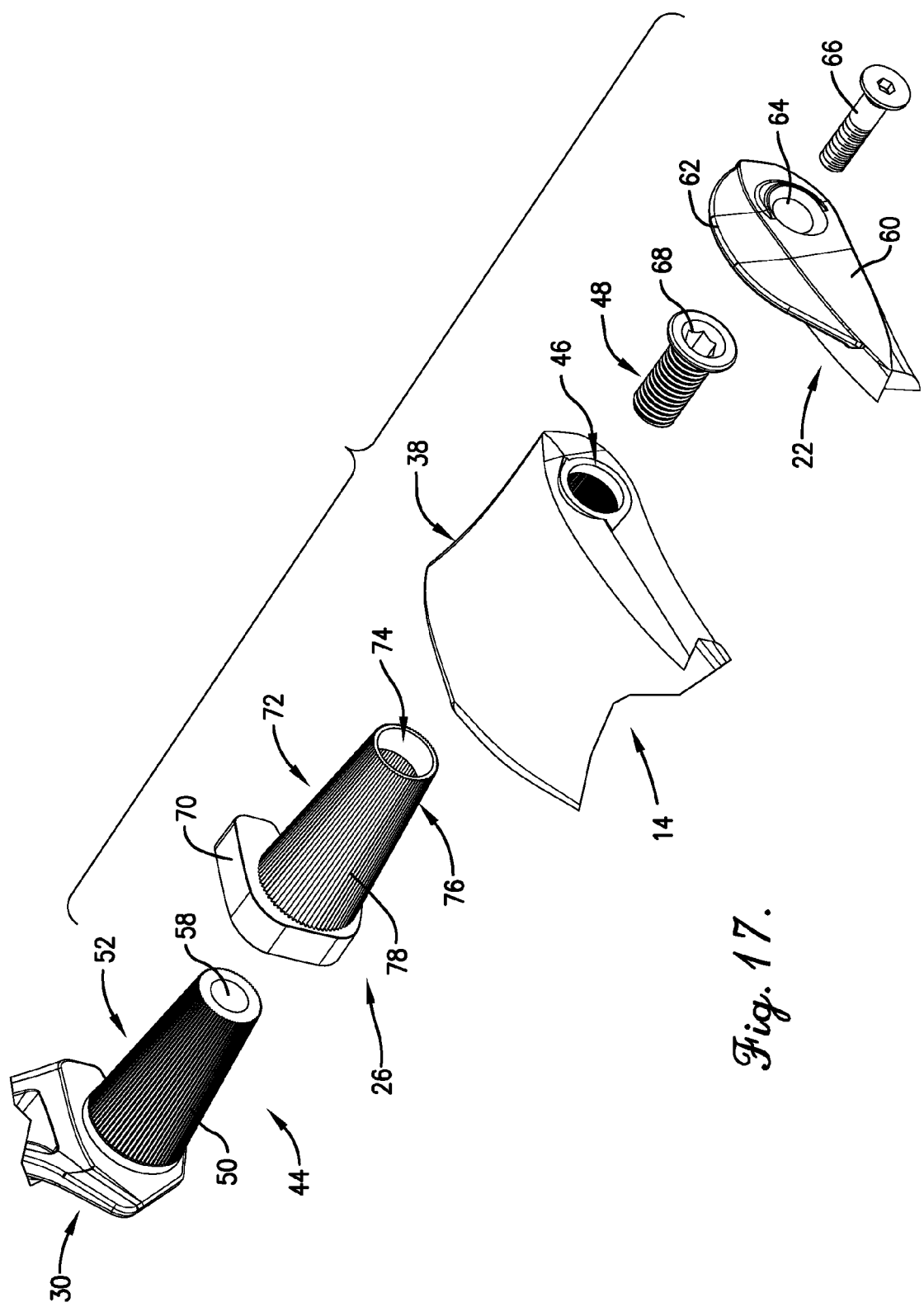
FIG. 17 is a forward perspective exploded view of the left leg unit, the left leg rotation control assembly, and the spacer in isolation.
Figure 18:
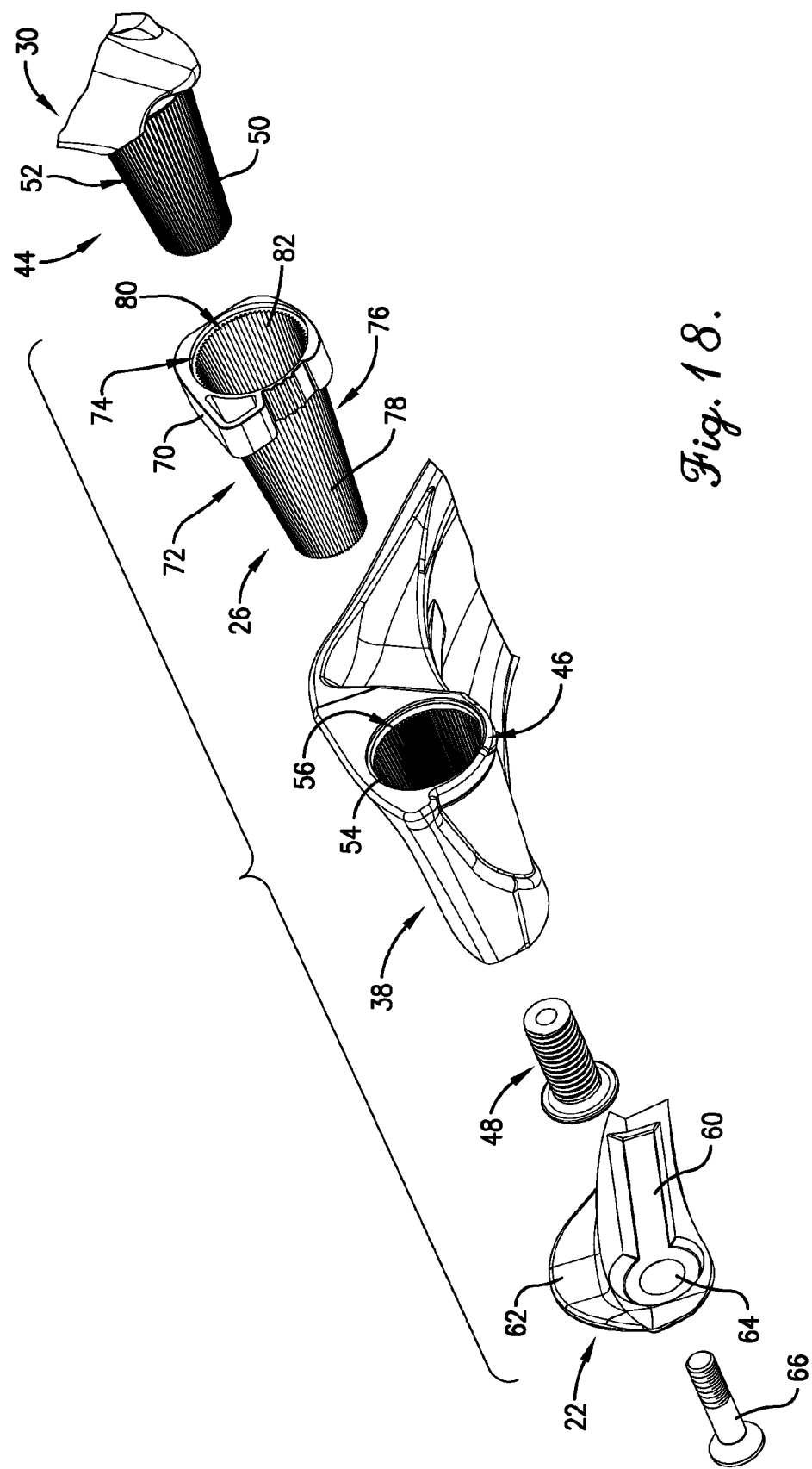
FIG. 18 is a rear perspective exploded view of the left leg unit, the left leg rotation control assembly, and the spacer in isolation.

The present disclosure is more particularly described in the following examples that are intended as illustrative only since numerous modifications and variations therein will be apparent to those skilled in the art. Various embodiments of the disclosure are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. The use of examples anywhere in this specification, including examples of any terms discussed herein, is illustrative only, and in no way limits the scope and meaning of the disclosure or of any exemplified term. Likewise, the disclosure is not limited to various embodiments given in this specification.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising," "including," "having," "containing," "involving," and the like are to be understood to be open-ended, i.e., to mean including but not limited to.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

The description will be made as to the embodiments of the present invention in conjunction with the accompanying drawings in FIGS. 1-21. In accordance with the purposes of this invention, as embodied and broadly described herein, this invention, in one aspect, relates to a head and neck support (HANS) device.

The head and neck support device 10 that is adjustable, constructed in accordance with various embodiments of the current invention, is shown in FIGS. 1-5 and 12-13. The HANS device 10 broadly comprises a collar 12, a left leg unit 14, a right leg unit 16, a left leg rotation control assembly 18, a right leg rotation control assembly 20, a left epaulet 22, a right epaulet 24, a spacer 26, and a belt clip 28. The HANS device 10 may also include openings, loops, or other accessories or features on the collar 12 or elsewhere to accommodate a tether or strap that connects to a wearer's helmet.

The collar 12, as shown in FIGS. 1-5 and 12-13, is a generally upright member and may include a left portion 30, a spaced-apart right portion 32, and a central portion 34 positioned therebetween. The bottom of the central portion 34 may have an arch shape or curvature that engages the lower part of the neck and the upper part of the back of the wearer. In addition, the bottom of the central portion 34 may have rounded edges for comfort. The left portion 30 and the right portion 32 of the collar 12 may taper forward from the central portion 34 such that the collar 12 wraps around at least part of the wearer's neck.

The collar 12 is generally rigid and may be manufactured from stiff material, such as material that can be formed into a hard mold or injected into a hard mold like injection molded metal alloy material, or formable composite material, such as formable carbon fiber or thermal set composite material. An exemplary collar 12 may be manufactured from thixentropic injection molded magnesium, "THIXO", that includes a range of alloys such as AZ91, AM60, and the like. The THIXO alloys may include parameters such as a tensile strength of approximately 35,000 to approximately 40,000 psi, a stiffness (modulus) of approximately 7,500,000 psi, and an elongation of approximately 5% to approximately 13%.

In various embodiments, the magnesium is overmolded in an injection molded process with a Hytrell® (from DuPont of Wilmington, Del.) shell. The THIXO magnesium is fire resistant and provides a protective coating for the HANS device 10, as well as a soft-touch surface for comfort. The THIXO magnesium also provides a traction surface for shoulder straps or belts.

The left leg unit 14, as shown in FIGS. 1-5 and 10-13, is generally elongated and may include a left chest portion 36 and a left shoulder portion 38. The left chest portion 36 may extend forward from the left shoulder portion 38 and engage the wearer's chest. The left shoulder portion 38 may be wider and thicker than the left chest portion 36 with a curvature on its bottom side to match the wearer's shoulder. The left leg unit 14 may also include an inner side closer to the wearer's neck and an outer side farther from the wearer's neck. The left leg unit 14 may couple with the collar 12 on the inner side and couple with the left epaulet 22 on the outer side. The left shoulder portion 38 may also include the left leg rotation control assembly 18 which allows the left leg unit 14 to rotatably couple with the left portion 30 of the collar 12. The left leg unit 14 may be manufactured from rigidized or stiffened material. An exemplary left leg unit 14 may be manufactured from THIXO AM60 alloy.

The left leg unit 14 may accept a left shoulder strap or belt from a 4-point or 5-point harness or other safety restraint system that is used in racing vehicles. When the driver is in the vehicle with the harness or restraint system engaged, the left shoulder strap typically rests on top of the left leg unit 14.

The right leg unit 16, as shown in FIGS. 1, 2, 12 and 13, may include the same features as the left leg unit 14 and may be shaped as the mirror image of the left leg unit 14. Accordingly, the right leg unit 16 may include a right chest portion 40 and a right shoulder portion 42. The right leg unit 16 may couple with the collar 12 on the inner side and couple with the right epaulet 24 on the outer side. The right shoulder portion 42 may include the right leg rotation control assembly 20 which allows the right leg unit 16 to rotatably couple with the right portion 32 of the collar 12. Furthermore, the right leg unit 16 may be manufactured from rigidized or stiffened material. An exemplary right leg unit 16 may be manufactured from THIXO AM60 alloy.

The right leg unit 16 may accept a right shoulder strap from a 4-point or 5-point harness or other safety restraint system that is used in racing vehicles. When the driver is in the vehicle with the harness or restraint system engaged, the right shoulder strap typically rests on top of the right leg unit 16.

The left leg rotation control assembly 18, best shown in FIGS. 6, 7, 10-11, and 17-18, generally allows the left leg unit 14 to adjustably rotate with respect to the collar 12. Specifically, when the HANS device 10 is not in use, the left leg unit 14 may be rotated with respect to the collar 12 to accommodate different body sizes of drivers or different racing or vehicular requirements. A larger body size or a more laid back position in the driver's seat may require a greater angle between the left leg unit 14 and the collar 12. A smaller body size or a more upright position in the driver's seat more require a smaller angle between the left leg unit 14 and the collar 12. Thus, before a racing event, the left leg unit 14 may be rotated with respect to the collar 12 to provide comfort and safety for the wearer. After the adjustment has been made, the left leg unit 14 may remain rigidly fixed with respect to the collar 12.

The left leg rotation control assembly 18 may include components that, in a first state, allow selective rotation of the left leg unit 14 when desired, but, in a second state, lock the left leg unit 14 in position when rotation is not desired. Various embodiments of the left leg rotation control assembly 18 include a male spline 44, a female spline 46, and a spline fastener 48.

Figure 21:
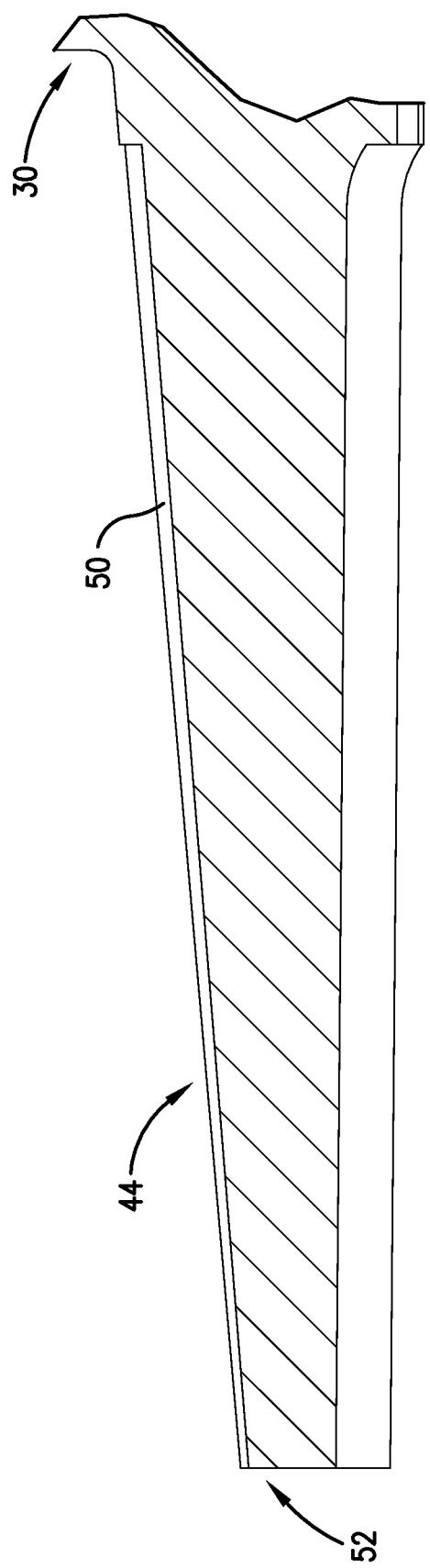
FIG. 21 is a sectional view of the male spline taken along line 21-21 from FIG. 20.

The male spline 44, as shown in FIGS. 7-11 and 15-21, may include a plurality of spaced apart outer teeth 50 distributed circumferentially on an outer surface 52 of the male spline 44. In addition, the outer surface 52 may be linearly tapered or frustoconical shaped with one end that is smaller in diameter and an opposing end that is larger in diameter. The outer teeth 50 may be aligned with the central conical axis. Furthermore, the outer teeth 50 may be linearly tapered as well such that at the smaller end of the male spline 44, the outer teeth 50 have a first height and at the larger end of the spline 44, the outer teeth 50 have a second, greater height, as best seen in FIGS. 19-21. Thus, the height of the outer teeth 50 increases along the length of the male spline 44. The male spline 44 may be coupled to the left leg unit 14 or the collar 12, but in exemplary embodiments, the larger end of the male spline 44 is coupled to the left portion 30 of the collar 12 and points outward therefrom. In various embodiments, the male spline 44 may be oriented at an angle 10 degrees forward from the back of the collar 12 and 10 degrees downward from the top of the collar 12.

The male spline includes a plurality of outer teeth spaced-apart formed on the outer surface thereof. For example, an exemplary male spline 44 has 72 outer teeth 50 that are spaced 5 degrees apart on the outer surface 52. Other embodiments may have more or less teeth depending on performance and manufacturing considerations. Furthermore, the spacing between the teeth may be uniform or non-uniform. Generally, for uniform spacing, the space between teeth equals 360 degrees divided by the number of teeth. Common spacings of outer teeth 50 on the male spline 44 may also include 7.5 degrees and 10 degrees. The taper angle of the outer surface 52 may vary from approximately 2.5 degrees to approximately 8.5 degrees, although the outer surface 52 of an exemplary male spline 44 may have a taper angle of approximately 5 degrees. The taper angle of the outer teeth 50 may depend on a number of variable factors including, but not limited to, the length of the male spline 44 shaft, the number of outer teeth 50, the angle that the outer teeth 50 form with the circumference of the outer surface 52, the depth of the outer teeth 50, and the like. The outer teeth 50 of an exemplary male spline 44 may have a taper angle of approximately 1 degree. The non-zero taper angle of the outer teeth 50 and the outer surface 52 may make the male spline 44 easier to manufacture when using an injection molding process.

The female spline 46, as shown in FIGS. 7-11 and 15-18, may include a plurality of spaced apart inner teeth 54 distributed circumferentially on an inner surface 56 of the female spline 46. In addition, the inner surface 56 may be linearly tapered or frustoconical shaped with one end that is smaller in diameter and an opposing end that is larger in diameter. The inner teeth 54 may be aligned with the central conical axis. Furthermore, the inner teeth 54 may be linearly tapered as well such that at the smaller end of the female spline 46, the inner teeth 54 have a first height and at the larger end of the spline 46, the inner teeth 54 have a second, greater height. Thus, the height of the inner teeth 54 increases along the length of the female spline 46. The female spline 46 may be coupled to the left leg unit 14 or the collar 12, but in exemplary embodiments, the female spline 46 is coupled to or positioned within the left shoulder portion 38 such that the larger end is on the inner edge and the smaller end is on the outer edge of the left leg unit 14. In various embodiments, the female spline 46 may be oriented at an angle 10 degrees forward from the back of the collar 12 and 10 degrees downward from the top of the collar 12.

The female spline includes a plurality of inner teeth spaced-apart formed on the inner surface thereof. The inner teeth 54 of the female spline 46 align and interlock with the outer teeth 50 of the male spline 44 when the left leg rotation control assembly 18 is in a locked position. Thus, the female spline 46 may have complementary features to the male spline 44. An exemplary female spline 46 may include 72 inner teeth 54 that are spaced 5 degrees apart on the inner surface 56, although other numbers of teeth with different spacing is possible. Other common spacings of inner teeth 54 on the female spline 46 may include 7.5 degrees and 10 degrees. The taper angle of the inner surface 56 may vary from approximately 4.5 degrees to approximately 6.5 degrees, although the inner surface 56 of an exemplary female spline 46 may have a taper angle of approximately 5 degrees. The taper angle of the inner teeth 54 may depend on the same factors as discussed above. The inner teeth 54 of an exemplary female spline 46 may have a taper angle of approximately 1 degree. As with the male spline 44, the taper angle of the inner teeth 54 and the inner surface 56 may make the female spline 46 easier to manufacture when using an injection molding process.

The spline fastener 48, as shown in FIGS. 7, 9-11, 15, 17, and 18, generally retains the female spline 46 on the male spline 44. The spline fastener 48 may include a threaded outer surface. In various embodiments, the male spline 44 may include a central axially-aligned first opening 58 that is threaded and may receive the spline fastener 48.

The left leg rotation control assembly 18 may operate as follows. The spline fastener 48 may be removed or loosened from the male spline 44. The female spline 46 may be spaced apart from the male spline 44 and rotated. Although the female spline 46 may be rotated to any angular position with respect to the male spline 44, the inner teeth 54 and the outer teeth 50 mesh in 5-degree increments. Once the desired angular position of the female spline 46 is achieved, the female spline 46 may be pushed onto the male spline 44 so that the inner teeth 54 lock with the outer teeth 50. The spline fastener 48 may be inserted into the first opening 58 of the male spline 44 and tightened. The tightening of the spline fastener 48 provides axial compression of the male spline 44 and the female spline 46 which serves to increase the grip between the two. Thus, the left leg rotation control assembly 18 is in a locked position.

The right leg rotation control assembly 20 serves the same purpose as the left leg rotation control assembly 18 and includes the same components; namely, the male spline 44, the female spline 46, and the spline fastener 48. However, the components of the right leg rotation control assembly 20 may be oriented in a mirror image to the left leg rotation control assembly 18. Although other configurations are possible, the male spline 44 of the right leg rotation control assembly 20 may be coupled to the right portion 32 of the collar 12 and may protrude therefrom. The female spline 46 may be coupled to or positioned within the right shoulder portion 42. In addition, the right leg rotation control assembly 20 may function in the same manner as the left leg rotation control assembly 18, described above.

The left epaulet 22, as shown in FIGS. 1-7, 10-15, and 17-18, generally couples with the left shoulder portion 38 to retain the left shoulder strap of the safety harness on the top surface of the left leg unit 14. Without the left epaulet 22, the shoulder strap may have a tendency to slide off of the left leg unit 14. The left epaulet 22 may include an elongated narrow body 60 with an upward flare 62. The upward flare 62 provides a barrier to the left should safety strap slipping off of the shoulder portion of the left leg unit 14. The upward flare 62 may have a variable height. In some situations, a taller epaulet is required. In other situations where a tall epaulet is not required, a shorter epaulet may be preferred because it allows the driver to exit the vehicle more easily. Thus, there may be several embodiments of the left epaulet 22, each with an upward flare 62 of a different height. The left epaulet 22 may also include a second opening 64 through which an epaulet fastener 66 may be positioned.

In use, the left epaulet 22 may be positioned on the outer edge of the left shoulder portion 38. The epaulet fastener 66, which is typically threaded, may be inserted through the second opening 64 into a third opening 68 that is positioned along the central axis of the spline fastener 48 and tightened. In certain embodiments of the HANS device 10, the left epaulet 22 may be omitted.

The right epaulet 24, as shown in FIGS. 1, 2, 12 and 13, generally couples with the right shoulder portion 42 to retain the right shoulder strap of the safety harness on the top surface of the right leg unit 16. The right epaulet 24 includes the same features (the body 60, the upper flare 62, and the second opening 64) as the left epaulet 22 although the features are oriented in a mirror image of the left epaulet 22. The right epaulet 24 may be fastened to the right leg unit 16 in the same fashion as the left epaulet 22 is to the left leg unit 14. In certain embodiments of the HANS device 10, the right epaulet 24 may be omitted.

The spacer 26, as shown in FIGS. 12-15 and 17-18, generally positions the left leg unit 14 or the right leg unit 16 outward from the collar 12, thereby increasing the separation between the left leg unit 14 and the right leg unit 16 to accommodate drivers with a larger or wider from shoulder to shoulder body size. Typically, one spacer 26 is used to space the left leg unit 14 and one spacer 26 is used to space the right leg unit 16. The spacer 26 may have a tapered or frustoconical shape with a larger diameter end and an opposing smaller diameter end and may include a ring 70, an outer spline 72, and an inner spline 74. The ring 70 may be positioned at the larger end and may include a thickness that determines the amount of separation that the spacer 26 adds between the left leg unit 14 or the right leg unit 16 and the collar 12. In various embodiments, the ring 70 may have a thickness of approximately 10 millimeters.

The outer spline 72 may include an outer surface 76 with a plurality of outer teeth 78 distributed around the circumference thereof. The outer spline 72 may be substantially the same as the male spline 44, with the same taper angle of the outer surface 76 and the outer teeth 78. The inner spline 74 may include an inner surface 80 with a plurality of inner teeth 82 distributed around the circumference thereof. The inner spline 74 may be substantially the same as the female spline 46, with the same taper angle of the inner surface 80 and the inner teeth 82. Thus, exemplary embodiments of the outer spline 72 and the inner spline 74 may include 72 teeth spaced 5 degrees apart, although other numbers of teeth with different spacings are possible.

In order to utilize the spacer 26, the left leg unit 14 and the right leg unit 16 must be decoupled from the collar 12. Thus, the spline fastener 48 must be removed from both the left leg rotation control assembly 18 and the right leg rotation control assembly 20. In order to access the spline fastener 48, the left epaulet 22 and the right epaulet 24 must be removed. The epaulet fastener 66 may be removed from the spline fastener 48 for the left epaulet 22 and the right epaulet 24. Then the spline fastener 48 must be removed from the male spline 44 for both the left leg rotation control assembly 18 and the right leg rotation control assembly 20. With the spline fastener 48 removed, the left leg unit 14 and the right leg unit 16 may be detached from the collar 12, leaving the male splines 44 on the left portion 30 and the right portion 32 of the collar 12 exposed. A spacer 26 may be placed over the male spline 44 on the left portion 30 of the collar 12, and a spacer 26 may be placed over the male spline 44 on the right portion 32 of the collar 12. Both spacers 26 may be pushed onto the male splines 44 until the ring 70 contacts the collar 12 and the inner teeth 82 of the spacer 26 engage the outer teeth 50 of the male spline 44.

The left leg unit 14 may be recoupled to the collar 12 such that the inner teeth 54 of the female spline 46 engage the outer teeth 78 of the spacer 26. The spline fastener 48 may be inserted into the male spline 44 on the left portion 30 of the collar 12 and tightened. The left epaulet 22 may be repositioned on the left leg unit 14, and the epaulet fastener 66 may be inserted into the spline fastener 48 and tightened. Similar to the left leg unit 14, the right leg unit 16 may be recoupled to the collar 12 such that the inner teeth 54 of the female spline 46 engage the outer teeth 78 of the spacer 26. The spline fastener 48 may be inserted into the male spline 44 on the right portion 32 of the collar 12 and tightened. The right epaulet 24 may be repositioned on the right leg unit 16, and the epaulet fastener 66 may be inserted into the spline fastener 48 and tightened. In some embodiments, more than one spacer 26 may be placed on each male spline 44. In other embodiments, the spacer 26 may have a variable thickness ring 70.

The belt clip 28, as shown in FIGS. 1-5 and 10-13, generally retains the shoulder strap of the safety harness in place on the chest portion 36, 40 of the left leg unit 14 or the right leg unit 16. The belt clip 28 may include a body with an outward protruding lip 84. The belt clip 28 may further include a pair of tabs 86 opposing the lip 84 that each include an opening. The belt clip 28 may be attached to either the inner side of the left leg unit 14 or the outer side of the left leg unit 14. The lip 84 may be positioned on the upper surface of the left leg unit 14 and the tabs 86 on the lower surface with fasteners, such as screws, utilized to couple the tabs 86 and, in turn, the belt clip 28 to the left leg unit 14. The shoulder strap may be positioned between the lip 84 and the upper surface of the left chest portion 36 such that the belt clip 28 holds the shoulder strap in place. The belt clip 28 may function in the same fashion with the right leg unit 16.

The HANS device 10 is generally adjusted before the driver participates in a race. In some situations, the driver may have his shoulders measured to determine a spacing between shoulders. If spacers 26 for the HANS device 10 are required, then the left epaulet 22 and the right epaulet 24 may be removed, followed by the spline fasteners 48 and the left leg unit 14 and the right leg unit 16. The appropriate spacers 26 may be placed onto the male splines 44 on both the left portion 30 and the right portion 32 of the collar 12. The left leg unit 14 and the right leg unit 16 may be placed onto the spacers 26 and rotated to the proper angle for safety and comfort of the driver. Although the left leg unit 14 and the right leg unit 16 may be rotated to any angle in 5-degree increments, the left leg unit 14 and the right leg unit 16 are typically rotated between a 10-degree angle and a 45-degree angle with respect to the collar 12. The spline fasteners 48 may be replaced and tightened, and the left epaulet 22 and the right epaulet 24 may be replaced as well.

If spacers 26 are not needed but rotation adjustment is required, then the left epaulet 22 and the right epaulet 24 may be removed. The spline fasteners 48 may be loosened, but need not be removed. The left leg unit 14 and the right leg unit 16 may be pulled outward slightly, rotated to the appropriate angle, and then pushed back inward. The spline fasteners 48 may be retightened, and the left epaulet 22 and the right epaulet 24 may be replaced. After all adjustments have been made, the HANS device 10 of the current invention may be worn in the same manner as traditional HANS devices.

In one aspect of the present invention, a HANS device comprises: a collar operable to be positioned behind the neck of a driver; a left leg unit coupled to a left side of the collar operable to engage the left shoulder and a left portion of the chest of the driver; a right leg unit coupled to a right side of the collar operable to engage the right shoulder and a right portion of the chest of the driver; and a leg unit rotation control assembly including a plurality of male splines and a plurality of female splines operable to allow the left leg unit and the right leg unit to rotate with respect to the collar when the female splines are separated from the male splines and to rigidly fix the position of the left leg unit and the right leg unit with respect to the collar when the female splines are interlocked with the male splines.

In one embodiment, the HANS device further includes a first spacer positioned between the left leg unit and the collar and a second spacer positioned between the right leg unit and the collar, the first and second spacers operable to provide additional separation between the left leg unit and the right leg unit.

In one embodiment, the HANS device may also have a left epaulet removably coupled to the left leg unit and a right epaulet removably coupled to the right leg unit, each epaulet operable to prevent a shoulder strap from a safety harness from sliding off of a shoulder portion of the HANS device. In one embodiment, each epaulet includes an upward flare with a variable height.

Further, the HANS device may include a first belt clip removably coupled to the left leg unit and a second belt clip removably coupled to the right leg unit, each belt clip operable to retain a shoulder strap from a safety harness.

In addition, the HANS device also has a first spacer operable to be positioned between the first male spline and the first female spline and a second spacer operable to be positioned between the second male spline and the second female spline.

In one embodiment, the leg rotation control assembly includes a first male spline coupled to the left side of the collar, a second male spline coupled to the right side of the collar, a first female spline coupled to the left leg unit, and a second female spline coupled to the right leg unit.

In another embodiment, the leg rotation control assembly further includes a first threaded fastener to couple with an axial opening in the first male spline and a second threaded fastener to couple with an axial opening in the second male spline, each threaded fastener operable to hold one female spline in contact with one male spline.

In one embodiment, each male spline includes an outer surface that is tapered at a first angle and each female spline includes an inner surface tapered at the first angle, where the first angle ranges from approximately 2.5 degrees to approximately 8.5 degrees.

In another embodiment, each male spline includes a plurality of teeth spaced-apart formed on the outer surface thereof.

In one embodiment, the teeth are tapered with respect to the outer surface such that the height of the teeth increases along the length of the male spline.

In one embodiment, each female spline includes a plurality of teeth spaced-apart formed on the inner surface thereof.

In one embodiment, the teeth are tapered with respect to the inner surface such that the height of the teeth increases along the length of the female spline.

The HANS device further includes a first spacer operable to be positioned between the left leg unit and the collar and a second spacer operable to be positioned between the right leg unit and the collar, each spacer including an inner spline and an outer spline.

In one embodiment, the outer spline includes an outer surface that is tapered at a first angle and the inner spline includes an inner surface tapered at the first angle, where the first angle ranges from approximately 2.5 degrees to approximately 8.5 degrees.

In one embodiment of the HANS device described above, the outer spline includes 72 outer teeth positioned on the outer surface and spaced 5 degrees apart and the inner spline includes 72 inner teeth positioned on the inner surface and spaced 5 degrees apart.

In one embodiment of the HANS device described above, the outer teeth are tapered with respect to the outer surface such that the height of the outer teeth increases along the length of the outer spline and the inner teeth are tapered with respect to the inner surface such that the height of the inner teeth increases along the length of the inner spline.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A head and neck support (HANS) device, comprising:
   a collar operable to be positioned behind a wearer's neck;
   a left leg unit coupled to a left side of the collar operable to engage the wearer's left shoulder and chest area;
   a right leg unit coupled to a right side of the collar operable to engage the wearer's right shoulder and chest area, the right leg unit spaced apart from the left leg unit with the collar disposed medially therebetween;
   at least one leg unit rotation control assembly operable to allow at least one of the left leg unit and the right leg unit to rotate with respect to the collar in a first state and operable to fix the
   at least one of the left leg unit and the right leg unit in any one of a plurality of different angles with respect to the collar in a second state;
   wherein the leg rotation control assembly includes a first male spline coupled to the left side of the collar, a second male spline coupled to the right side of the collar, a first female spline coupled to the left leg unit, and a second female spline coupled to the right leg unit; and
   wherein each male spline comprises an outer surface that is tapered at a first angle and each female spline includes an inner surface tapered at the first angle.

2. The HANS device of claim 1, further comprising a first spacer positioned between the left leg unit and the collar and a second spacer positioned between the right leg unit and the collar, the spacers providing additional separation between the left leg unit and the right leg unit.

3. The HANS device of claim 1, further comprising a left epaulet removably coupled to the left leg unit and a right epaulet removably coupled to the right leg unit, each epaulet operable to prevent a shoulder strap from a safety harness from sliding off of a shoulder portion of the HANS device.

4. The HANS device of claim 3, wherein each epaulet comprises an upward flare with a variable height.

5. The HANS device of claim 1, wherein the first male spline is separated from the first female spline and the second male spline is separated from the second female spline in the first state, and wherein the first male spline is interlocked with the first female spline and the second male spline is interlocked with the second female spline in the second state.

6. The HANS device of claim 1, wherein the leg rotation control assembly further comprises a first threaded fastener coupled with an axial opening in the first male spline and a second threaded fastener coupled with an axial opening in the second male spline, each threaded fastener operable to hold one female spline in contact with one male spline.

7. The HANS device of claim 1, wherein the first angle ranges from approximately 2.5 degrees to approximately 8.5 degrees.

8. The HANS device of claim 1, wherein each male spline comprises a plurality of teeth spaced-apart formed on the outer surface thereof.

9. The HANS device of claim 8, wherein the teeth are tapered with respect to the outer surface such that a height of the teeth increases along a length of the male spline.

10. The HANS device of claim 1, wherein each female spline comprises a plurality of teeth spaced-apart formed on the inner surface thereof.

11. The HANS device of claim 10, wherein the teeth are tapered with respect to the inner surface such that a height of the teeth increases along a length of the female spline.

12. A head and neck support (HANS) device, comprising:
    a collar operable to be positioned behind a wearer's neck;
    a left leg unit coupled to a left side of the collar operable to engage the wearer's left shoulder and chest area;
    a right leg unit coupled to a right side of the collar operable to engage the wearer's right shoulder and chest area, the right leg unit spaced apart from the left leg unit with the collar disposed medially therebetween;
    at least one leg unit rotation control assembly operable to allow at least one of the left leg unit and the right leg unit to rotate with respect to the collar in a first state and operable to fix the at least one of the left leg unit and the right leg unit in any one of a plurality of different angles with respect to the collar in a second state; and
    a first spacer positioned between the left leg unit and the collar and a second spacer positioned between the right leg unit and the collar, each spacer including an inner spline and an outer spline, wherein the outer spline comprises an outer surface that is tapered at a first angle and the inner spline includes an inner surface tapered at the first angle.

13. The HANS device of claim 12, wherein the first angle ranges from approximately 2.5 degrees to approximately 8.5 degrees.

14. The HANS device of claim 12, wherein the outer spline comprises a plurality of outer teeth spaced-apart formed on the outer surface thereof, and the inner spline comprises a plurality of inner teeth spaced-apart formed on the inner surface thereof.

15. The HANS device of claim 14, wherein the outer teeth are tapered with respect to the outer surface such that a height of the outer teeth increases along a length of the outer spline and the inner teeth are tapered with respect to the inner surface such that a height of the inner teeth increases along a length of the inner spline.

* * * * *